United States Patent
Baker et al.

(10) Patent No.: US 6,883,816 B2
(45) Date of Patent: Apr. 26, 2005

(54) AUTOMOTIVE BRAKE CORNER MODULE

(75) Inventors: Steven F. Baker, Bellevue, OH (US); Mark C. Zifcak, Elyria, OH (US)

(73) Assignee: Delphi Technologies, Inc., Troy, MI (US)

( * ) Notice: Subject to any disclaimer, the term of this patent is extended or adjusted under 35 U.S.C. 154(b) by 107 days.

(21) Appl. No.: 10/304,268

(22) Filed: Nov. 26, 2002

(65) Prior Publication Data

US 2004/0100058 A1 May 27, 2004

(51) Int. Cl.[7] ................................................ B62D 7/18
(52) U.S. Cl. ................................................ 280/93.512
(58) Field of Search ........................ 280/93.512, 93.513, 280/124.11, 124.113, 124.125, 89.1; 301/105.1, 125; 384/544

(56) References Cited

U.S. PATENT DOCUMENTS

| | | | | |
|---|---|---|---|---|
| 4,094,376 A | * | 6/1978 | Welschof | ..................... 180/254 |
| 4,958,944 A | * | 9/1990 | Hofmann et al. | ........... 384/512 |
| 5,429,425 A | | 7/1995 | Drott | .............................. 303/3 |
| 5,782,566 A | * | 7/1998 | Bertetti | ....................... 384/537 |
| 6,170,919 B1 | * | 1/2001 | Hofmann et al. | ......... 301/105.1 |
| 6,367,830 B1 | | 4/2002 | Annequin et al. | ..... 280/93.512 |
| 6,371,574 B1 | | 4/2002 | Hageman et al. | |
| 6,485,109 B1 | * | 11/2002 | Brinker et al. | ........... 301/105.1 |
| 6,549,126 B1 | | 4/2003 | Hageman et al. | |

* cited by examiner

Primary Examiner—Faye M. Fleming
(74) Attorney, Agent, or Firm—Michael D. Smith

(57) ABSTRACT

A brake corner module includes a wheel bearing assembly which is configured to be coupled to the steering knuckle of the module without requiring bolts or press fit. An outer ring of the bearing assembly has a flange on one end which engages the knuckle at one end of a bore through the knuckle and a second end which is configured to be deformed to engage the second end of the knuckle bore. The wheel bearing assembly is thus captured within the bore, eliminating the need for press fit or a snap ring to retain the wheel bearing assembly.

18 Claims, 3 Drawing Sheets

AUTOMOTIVE BRAKE CORNER MODULE

TECHNICAL FIELD

The present invention relates to vehicle suspensions, and more particularly to a brake corner module for supporting a wheel of a vehicle.

BACKGROUND OF THE INVENTION

The manufacture of modern automobiles typically involves the assembly of various modular components into a finished vehicle to promote efficiency of manufacture and to decrease costs. A typical modular component is the brake corner module which mounts a wheel to a vehicle and which may include a steering knuckle, a wheel bearing assembly, a suspension strut, a brake caliper assembly, and other components. The wheel bearing assembly is commonly press fit into the steering knuckle and retained using a snap ring or bolted directly to the knuckle. While these methods have proved successful from a functional standpoint, they also have several drawbacks. For example, manufacturing the wheel bearing components and corresponding steering knuckle to the tight tolerances required for adequate press fit increases manufacturing costs. Furthermore, press fitting the wheel bearing into the steering knuckle introduces variation in the amount of radial preload on the wheel bearing which effects the durability of the wheel bearing rolling elements.

There is thus a need for a wheel bearing unit and a method of assembling a wheel bearing to a steering knuckle which overcomes drawbacks of the prior art, such as those discussed above.

SUMMARY OF THE INVENTION

The present invention provides a brake corner module having a wheel bearing assembly that may be secured to a steering knuckle of the module without the need for bolts or press fitting the wheel bearing assembly into a bore of the knuckle. In one aspect of the invention, the wheel bearing assembly includes an outer bearing ring which is sized to be received in a bore through the steering knuckle. A flange on one end of the outer ring engages the knuckle at a first end of the bore, acting as a positive stop to locate the wheel bearing assembly within the bore. The other end of the outer ring is configured to be deformed in a radially outward direction to engage the knuckle at a second end of the bore after the wheel bearing assembly has been inserted within the bore to thereby secure the wheel bearing assembly within the bore. Advantageously, the bore of the steering knuckle and the wheel bearing assembly do not require the tight manufacturing tolerances associated with press fitting the wheel bearing assembly into the knuckle. Furthermore, the variation of preload on the outer ring due to press fit is reduced. In addition, the present invention eliminates the need for a snap ring to retain the wheel bearing assembly within the bore.

In another aspect, a corner module includes a suspension knuckle having a bore and a wheel bearing assembly, as described above, and couplable with the knuckle through the bore. The corner module may further include a suspension strut and a brake caliper assembly.

In yet another aspect of the present invention, a method of securing a wheel bearing to a suspension knuckle includes inserting the wheel bearing through a bore of the knuckle, engaging the knuckle at a first end of the bore with a first end of an outer ring of the wheel bearing, and deforming a second end of the outer ring to engage the knuckle at a second end of the bore to secure the wheel bearing assembly within the bore. These and other advantages, objectives and features of the invention will become more readily apparent to those of ordinary skill upon review of the following detailed description of illustrated embodiments of the invention.

BRIEF DESCRIPTION OF THE DRAWINGS

The present invention will now be described, by way of example, with reference to the accompanying drawings, in which.

DETAILED DESCRIPTION

Figure 1:
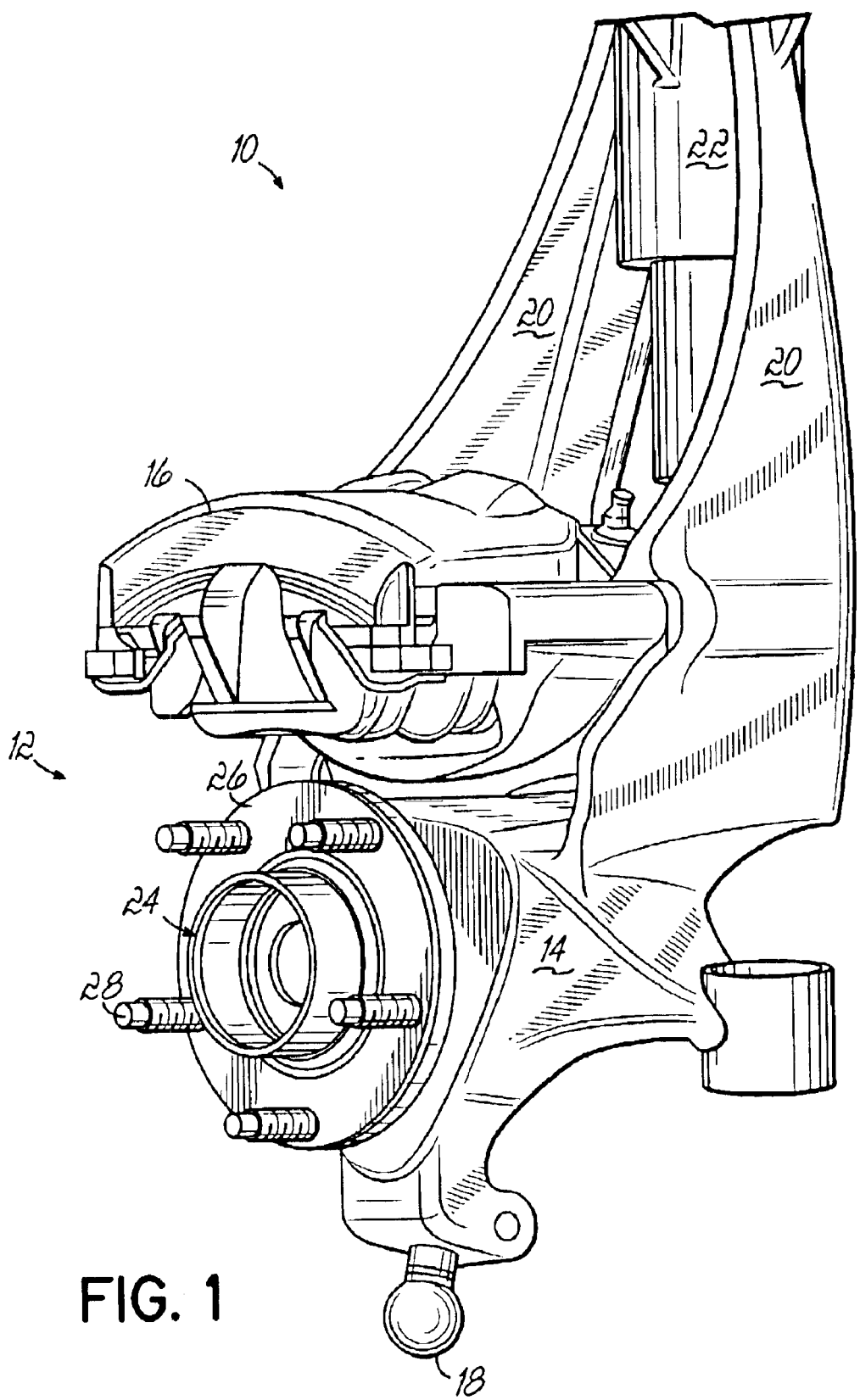
FIG. 1 is a perspective view of an automotive corner module, including a wheel bearing assembly according to the present invention.

Referring to FIG. 1, there is shown an automotive corner module 10, including an exemplary wheel bearing assembly 12 according to the present invention. The module 10 includes a steering knuckle 14 to which the wheel bearing assembly 12 is mounted, generally between a brake caliper assembly 16 and a lower control arm ball joint 18. The steering knuckle 14 further includes upwardly extending arms 20 which are couplable to the chassis of a vehicle and which support a suspension strut 22 of the module 10. The wheel bearing assembly 12 includes a hub 24 having a flange 26 that extends radially outward of the hub 24 and which supports a series of threaded studs 28, which have been press fit into the flange 26 for securing a wheel (not shown) to the wheel bearing.

Figure 2:
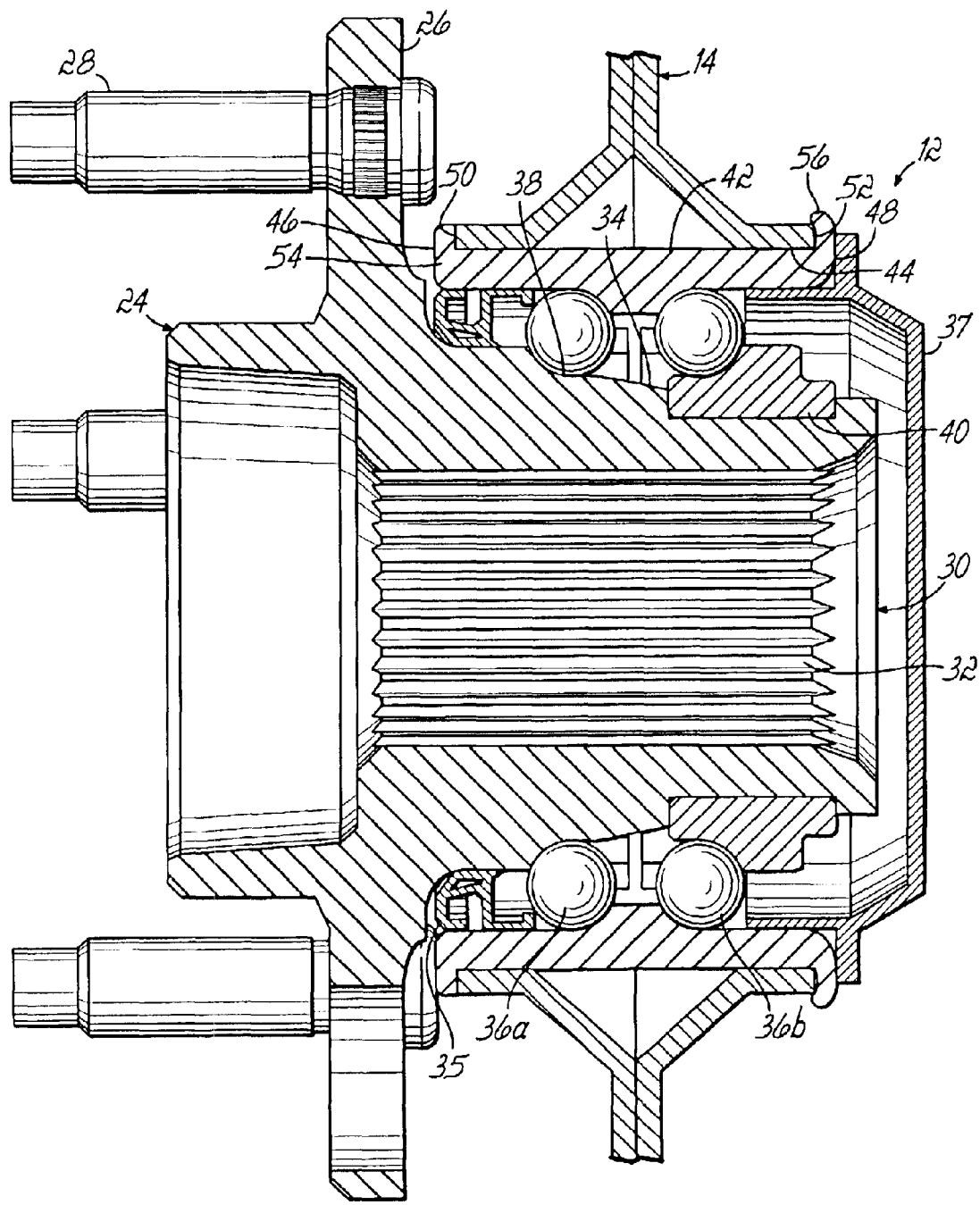
FIG. 2 is a partial cross-sectional view of an exemplary wheel bearing assembly of the present invention.

Referring now to FIG. 2, the hub 24 further includes a spindle 30 which extends in an axial direction relative to the flange 26. The spindle 30 may be solid or hollow in construction and, as depicted in the figure, the inner surface of a hollow spindle 30 may be formed with a spline 32 which is configured to engage a driving axle (not shown) of the vehicle. The outer surface 34 of the spindle 30 is generally contoured to receive the rolling elements 36 of the bearing, either directly, or contained within an inner ring member. In FIG. 2, a first series of rolling elements 36a is received directly in a groove 38 formed into the outer surface 34 of the spindle 30, and a second series of rolling elements 36b is supported between an inner ring 40 and an outer ring 42, which are sized to be received onto the spindle 30. The wheel bearing assembly 12 may further include packing elements 35 and a dust cap 37 to protect the rolling elements 36 from exposure to contaminants.

Figure 3A:
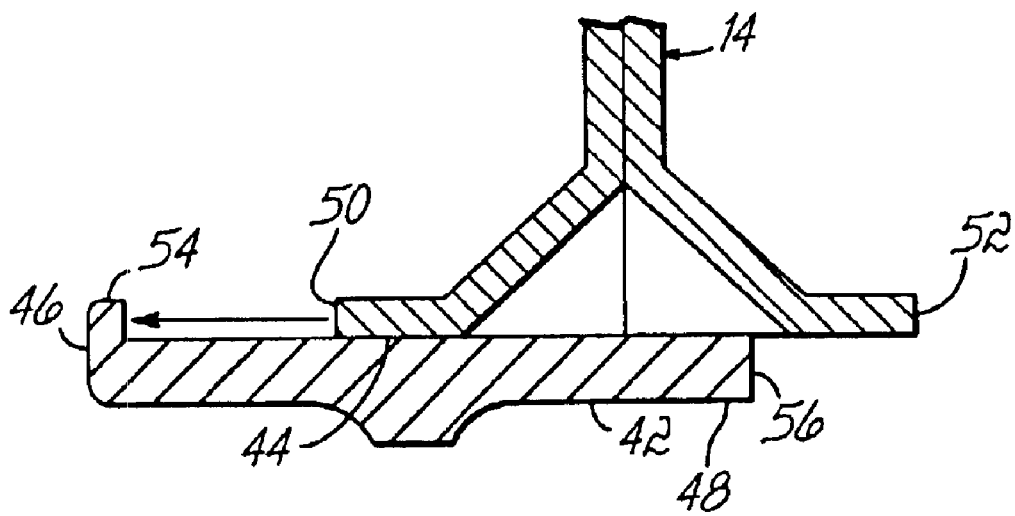
FIGS. 3A–3B are cross-sectional detail views illustrating assembly of the corner module.

As further depicted in FIG. 2, the wheel bearing assembly 12 is coupled to the steering knuckle 14 through a bore 44 in the knuckle 12 whereby the outer diameter of the outer ring 42 closely fits within the bore 44 of the knuckle 14. In the exemplary embodiment shown, first and second engagement portions 46, 48 of the outer ring 42 are configured to engage the knuckle 14 proximate first and second ends 50, 52 of the bore 44, respectively, to thereby secure the outer ring 42 within the bore 44 of the knuckle 14. In one exemplary embodiment, the first engagement portion 46 of the outer ring 42 includes a flange 54 that extends radially outward to engage the knuckle 14 at the end 50 of the bore 44. As depicted in FIG. 3A, the second engagement portion 48 initially extends in the axial direction and the flange 54 is formed on the outer ring 42 prior to insertion of the wheel bearing assembly 12 into the knuckle bore 44, whereby flange 54 forms a positive stop to position the wheel bearing assembly 12 within the bore 44 during assembly.

Figure 3B:
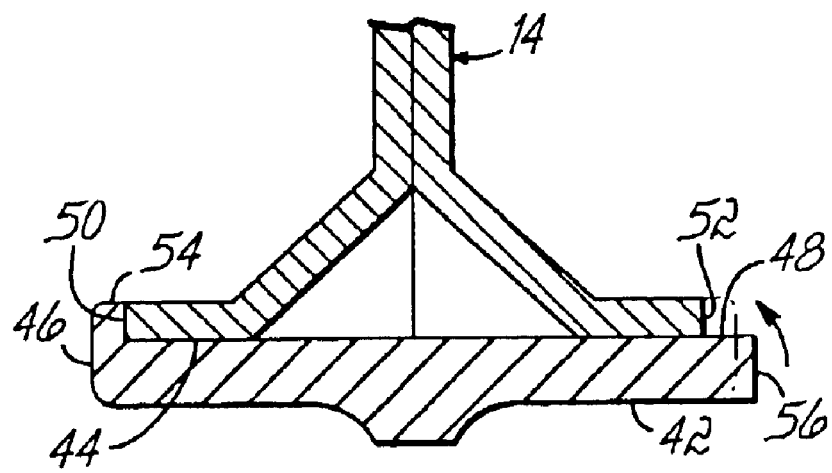

After the wheel bearing assembly 12 has been inserted within the bore 44 of the knuckle 14, a terminal end 56 of the second engagement portion 48 is deformed, such as by cold forming, to extend in an outward direction to thereby engage the knuckle 14, as depicted by the phantom lines in FIG. 3B, at the second end 52 of the bore 44. In this manner, the outer ring 42, and thus the wheel bearing assembly 12, is securely captured within the knuckle bore 44. Advantageously, the engagement portions 46, 48 of the outer ring 42 permit the wheel bearing assembly 12 to be secured within the knuckle bore 44 without requiring the tight tolerances typically associated with having to press fit the outer ring 42 into the knuckle bore 44. The design also eliminates the snap ring used on conventional modules to retain the wheel bearing assembly into the bore.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope or spirit of Applicant's general inventive concept.

What is claimed is:

1. A wheel bearing unit for installation within a bore of a suspension knuckle of a vehicle, comprising:
    a wheel hub having a spindle extending along an axial direction of said hub;
    a rolling element bearing coupled to said hub, over said spindle, and received within the bore of the suspension knuckle; and
    an outer ring of said rolling element bearing having first and second engagement portions, said first engagement portion engaging the knuckle proximate a first end of the bore and said second engagement portion engaging the knuckle proximate a second end of the bore to thereby secure said outer ring within the bore.

2. The wheel bearing of claim 1, wherein said first engagement portion of said outer ring comprises a flange extending radially outward to thereby engage the knuckle at the first end of the bore.

3. A wheel bearing unit for installation within a bore of a suspension knuckle of a vehicle, comprising:
    a wheel hub having a spindle extending along an axial direction of said hub;
    a rolling element bearing coupled to said hub, over said spindle, and received within the bore of the suspension knuckle; and
    an outer ring of said rolling element bearing having first and second engagement portions, said first engagement portion engaging the knuckle proximate a first end of the bore and said second engagement portion engaging the knuckle proximate a second end of the bore to thereby secure said outer ring within the bore;
    wherein said second engagement portion includes a deformable terminal end that initially extends along said axial direction and is subsequently deformed to engage the knuckle at the second end of the bore after said rolling element bearing is received within the bore of the knuckle.

4. A vehicle suspension corner module, comprising:
    a suspension knuckle having a bore therethrough, said bore including first and second opposing ends;
    a wheel bearing coupled with said knuckle, through said bore, said wheel bearing including:
        a wheel hub having a spindle extending along an axial direction of said hub; and
        a rolling element bearing coupled to said hub, over said spindle, and received within said bore of said knuckle, said rolling element bearing having an outer ring with first end second engagement portions, said first engagement portion engaging said knuckle proximate said first end of said bore end said second engagement portion engaging said knuckle proximate said second end of said bore to thereby secure said outer ring within said bore.

5. A vehicle suspension corner module, comprising:
    a suspension knuckle having a bore therethrough, said bore including first and second opposing ends;
    a wheel bearing coupled with said knuckle, through said bore, said wheel bearing including:
        a wheel hub having a spindle extending alone an axial direction of said hub; and
        a rolling element bearing coupled to said hub, over said spindle, and received within said bore of said knuckle, said rolling element bearing having an outer ring with first and second engagement portions, said first engagement portion engaging said knuckle proximate said first end of said bore and said second engagement portion engaging said knuckle proximate said second end of said bore to thereby secure said outer ring within said bore;
    wherein said second engagement portion includes a deformable terminal end that initially extends along said axial direction and is subsequently deformed to engage said knuckle after said rolling element bearing is received within said bore of said knuckle.

6. The corner module of claim 4, further comprising a suspension strut.

7. The corner module of claim 4, further comprising a brake caliper assembly.

8. A method of securing a wheel bearing to a suspension knuckle, comprising the steps of:
    inserting the wheel bearing within a bore of the knuckle, the wheel bearing having an outer ring with first and second engagement portions;
    engaging the knuckle proximate a first end of the bore with the first engagement portion; and
    deforming the second engagement portion to engage the knuckle proximate a second end of the bore to thereby secure the outer ring within the bore.

9. The method of claim 8, wherein the first engagement portion has a flange extending in a direction radially outward of on axial direction of the bore and the step of engaging the knuckle proximate a first end of the bore includes engaging the flange against the knuckle at the first end of the bore.

10. The method of claim 8, wherein the step of deforming the second engagement portion further comprises deforming the second engagement portion in a direction radially outward of an axial direction of the bore.

11. A method of securing a wheel bearing to a suspension knuckle, the wheel bearing having an outer ring with first and second engagement portions, the first engagement portion including a flange, the method comprising the steps of:

inserting the wheel bearing within a bore of the knuckle;

engaging the knuckle proximate a first end of the bore with the flange of the first engagement portion; and deforming the second engagement portion in a direction radially outward of an axial direction of the bore to thereby secure the outer ring of the wheel bearing within the bore.

12. A wheel bearing unit for installation within a bore of a suspension knuckle of a vehicle, comprising:

a wheel hub having a spindle extending along an axial direction of said hub, a rolling element bearing coupled to said hub, over said spindle, and received within the bore of the suspension knuckle; and an outer ring of said rolling element bearing sized to be closely fit within the bore of the knuckle without interference, and having first and second engagement portions, said first engagement portion engaging the knuckle proximate a first end of the bore and said second engagement portion engaging the knuckle proximate a second end of the bore to thereby secure said outer ring within the bore.

13. A method of securing a wheel bearing to a suspension knuckle, the wheel bearing having an outer ring with first and second engagement portions, the first engagement portion including a flange, the method comprising the steps of:

closely fitting the outer ring of the wheel bearing within a bore of the knuckle without interference;

engaging the knuckle proximate a first end of the bore with the flange of the first engagement portion; and deforming the second engagement portion in a direction radially outward of an axial direction of the bore to thereby secure the outer ring of the wheel bearing within the bore.

14. The wheel bearing unit of claim 1, wherein at least one of said first and second engagement portions is integrally formed with said outer ring.

15. The wheel bearing unit of claim 1, wherein said rolling element bearing is centrally located within the bore of the knuckle.

16. The wheel bearing unit of claim 3, wherein said rolling element bearing is centrally located within the bore of the knuckle.

17. The corner module of claim 5, wherein said rolling element bearing is centrally located within said bore of said knuckle.

18. The method of claim 8, further comprising:

centrally locating the wheel bearing within the bore.

* * * * *